United States Patent
Lin

(10) Patent No.: US 6,615,708 B1
(45) Date of Patent: Sep. 9, 2003

(54) FILTERING DEVICE FOR SMOKE PRODUCED BY A COOKER

(75) Inventor: Chin-Tao Lin, Tainan (TW)

(73) Assignee: Yueh-Kong Cheng Lin, Tainan (TW)

( * ) Notice: Subject to any disclaimer, the term of this patent is extended or adjusted under 35 U.S.C. 154(b) by 0 days.

(21) Appl. No.: 10/083,523

(22) Filed: Feb. 27, 2002

(51) Int. Cl.$^7$ .............................. A47J 37/00; A47J 27/00
(52) U.S. Cl. ............................ 99/476; 99/467; 99/426; 99/403; 126/21 A
(58) Field of Search .......................... 99/426, 467, 472, 99/476, 403, 422, 474; 126/21 A, 373.1; 55/471, 473

(56) References Cited

U.S. PATENT DOCUMENTS 5,029,519 A * 7/1991 Boyen ...................... 99/476 X
5,584,233 A * 12/1996 Glucksman et al. ...... 99/474 X
5,924,414 A * 7/1999 Schallig et al. ........... 99/403 X

* cited by examiner

Primary Examiner—Reginald L. Alexander
(74) Attorney, Agent, or Firm—Rosenberg, Klein & Lee

(57) ABSTRACT

A device for filtering the smoke produced by a cooker is provided. The cooker has a main body having an upper cover, and receives an inner pot. The main body has a rear holding part having a receiving room communicating with a vent aperture formed between the inner pot and the main body. The upper cover is pivoted to a support member formed on top of the holding part. The holding part has a rear opening. The filtering device includes a curved net fitted to the support member, thus allowing smoke to travel from the vent aperture into the receiving room. The filtering device further has a fan, a rear net, and a filter cotton. The fan is disposed in the receiving room, and faces the rear opening. The rear net is fixedly disposed in the rear opening. The filter cotton is disposed on an inner side of the rear net. When the fan is turned on, smoke produced by the cooker is made to travel through the curved net, the filter cotton as well as the rear net from the vent aperture for the soot in the smoke to be absorbed by the same.

4 Claims, 5 Drawing Sheets

FILTERING DEVICE FOR SMOKE PRODUCED BY A COOKER

BACKGROUND OF THE INVENTION

The present invention relates to a filtering device for smoke produced by a cooker, and more particularly a filtering device that can clean the smoke produced when the cooker is used so as to prevent the gas from harming the health of the nearby people.

Large amount of smoke would come into existence when a cooker is used to cook foods, especially a large cooker that is used in restaurants. Such smoke contains soot that is harmful to the health of people. So, the smoke has to be filtered otherwise people are likely to have lung diseases after having breathed in a lot of such smoke.

SUMMARY OF THE INVENTION

Therefore, it is a main object of the present invention to provide a filtering device for the smoke produced by a cooker so that the soot in the smoke can be absorbed by the filtering net and cotton thereof before the smoke is sent out to the atmosphere, thus preventing the soot from harming the health of the nearby people.

The cooker with the smoke filtering device of the present invention includes a main body, and an inner pot received in the main body. The main body has a rear holding part having a receiving room, which communicates with a vent aperture formed between the inner pot and the main body. The upper cover is pivoted to a support member formed on top of the holding part. The holding part further has a rear opening.

The filtering device includes a curved net, a fan, a rear net, and a filter cotton. The curved net is fitted to the support member such that they smoke will first pass through the same when travelling from the vent aperture to the receiving room. The fan is disposed in the receiving room of holding part, and faces the rear opening the holding part. The rear net is fixedly disposed in the rear opening. The filter cotton is disposed on the inner side of the rear net.

Thus, when the cooker is used to cook foods, the fan can make the smoke produced by the cooker pass through the filter cotton, which will absorb the soot in the smoke, preventing the root from being emitted to harm the health of the user or nearby people.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
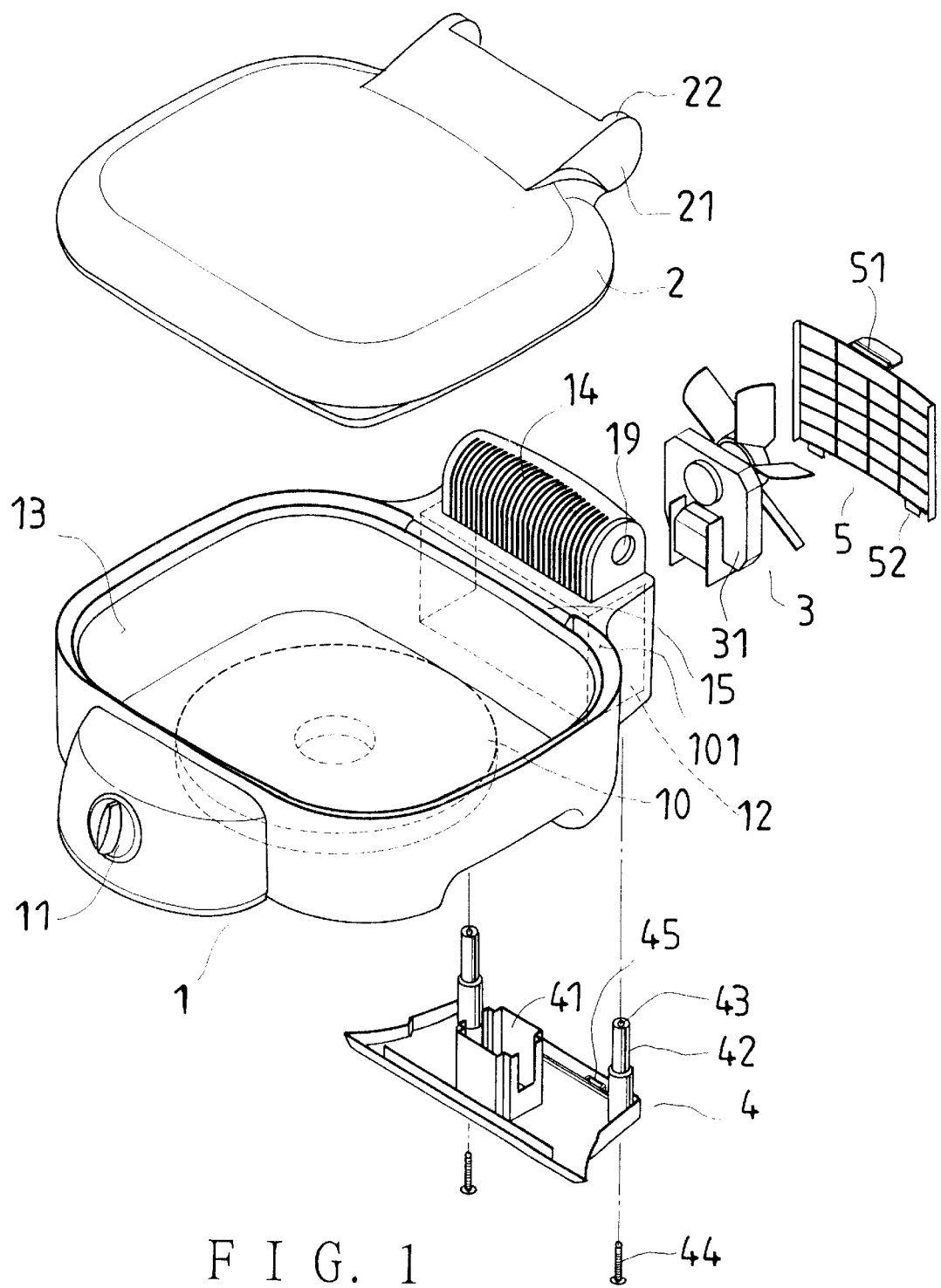
FIG. 1 is an exploded perspective view of a cooker with the smoke filtering device according to the present invention.
Figure 2:
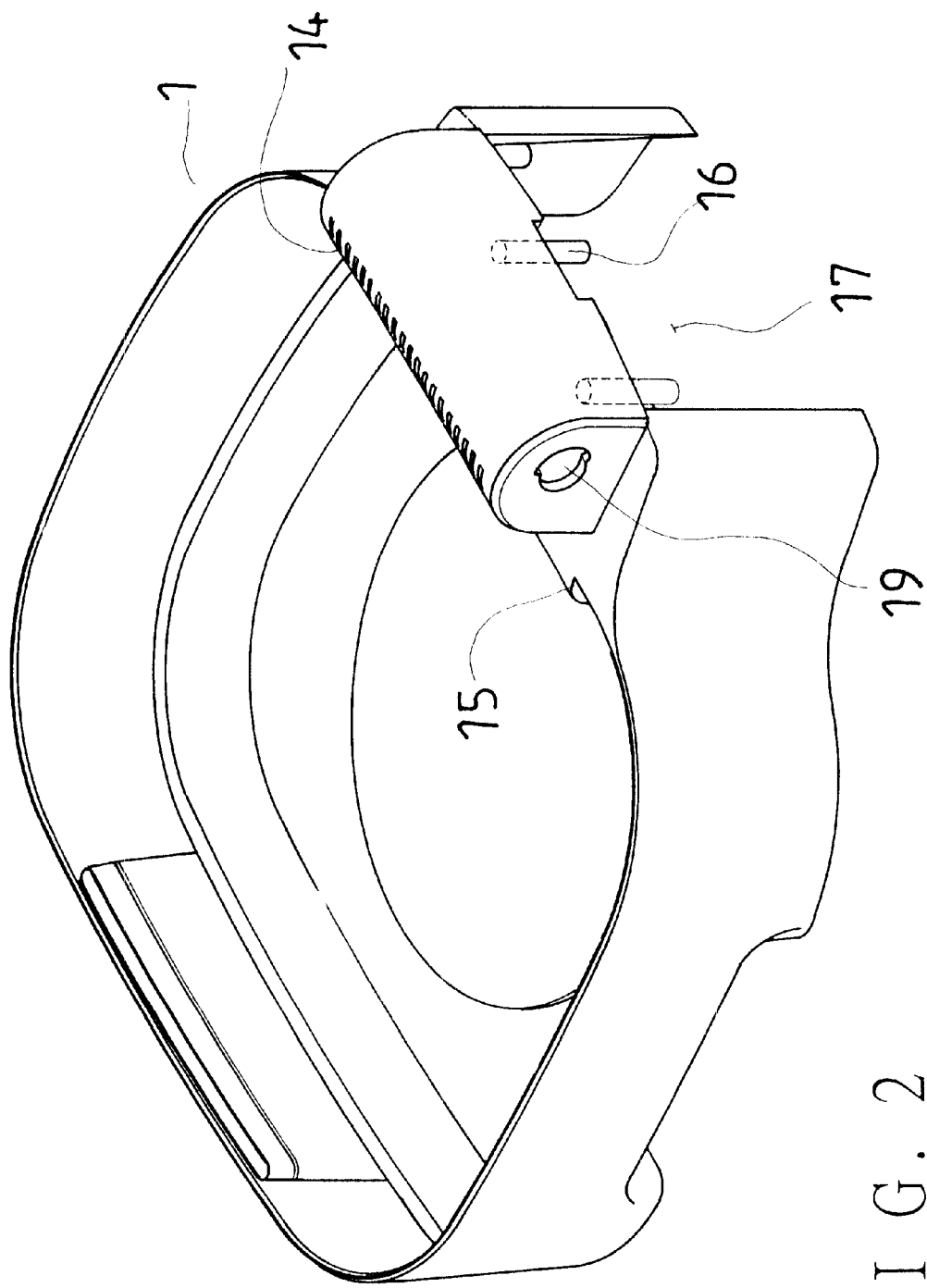
FIG. 2 is a perspective view of the main body of the cooker according to the present invention.
Figure 3:
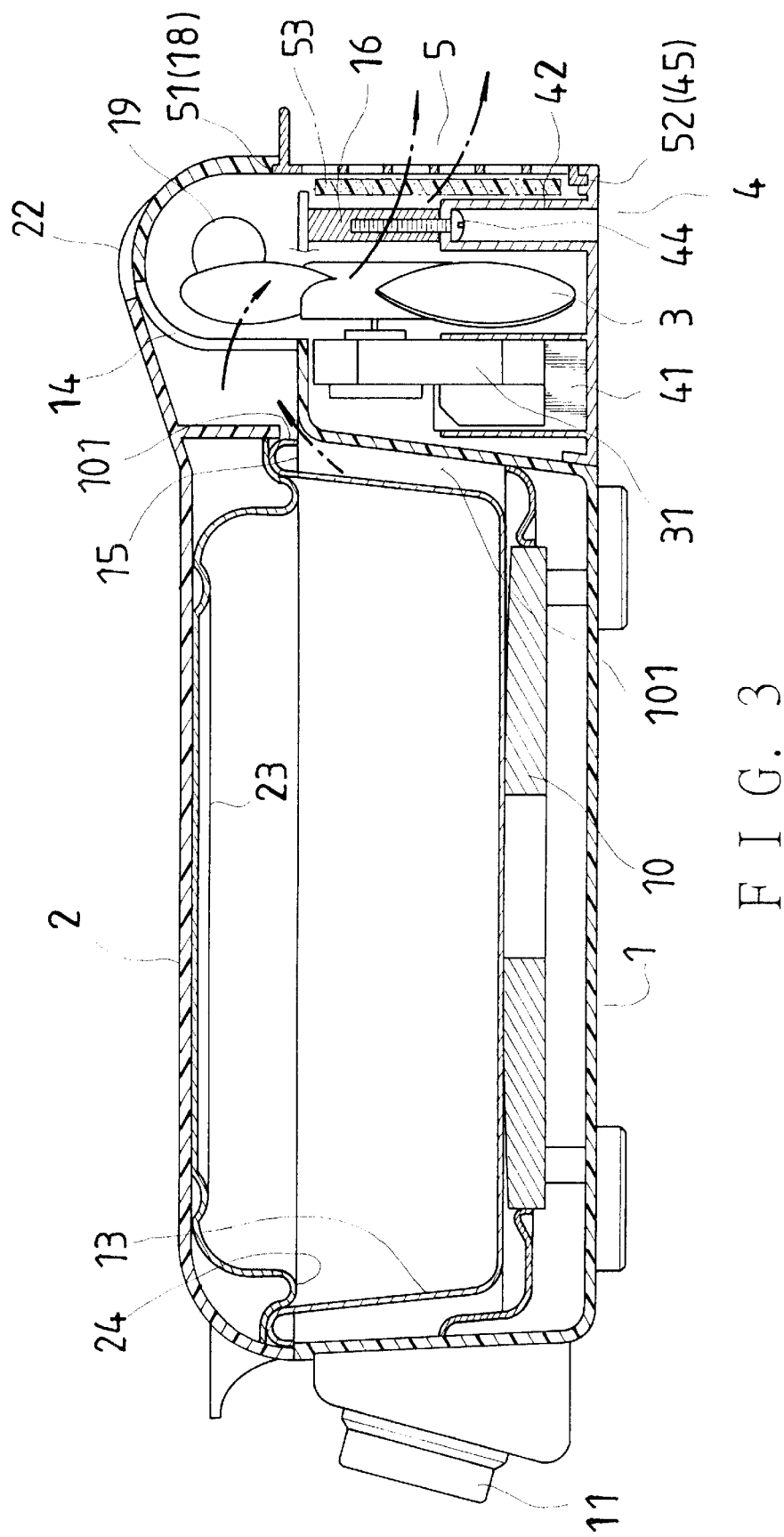
FIG. 3 is cross-sectional view of the cooker with the smoke filtering device according to the present invention.
Figure 4:
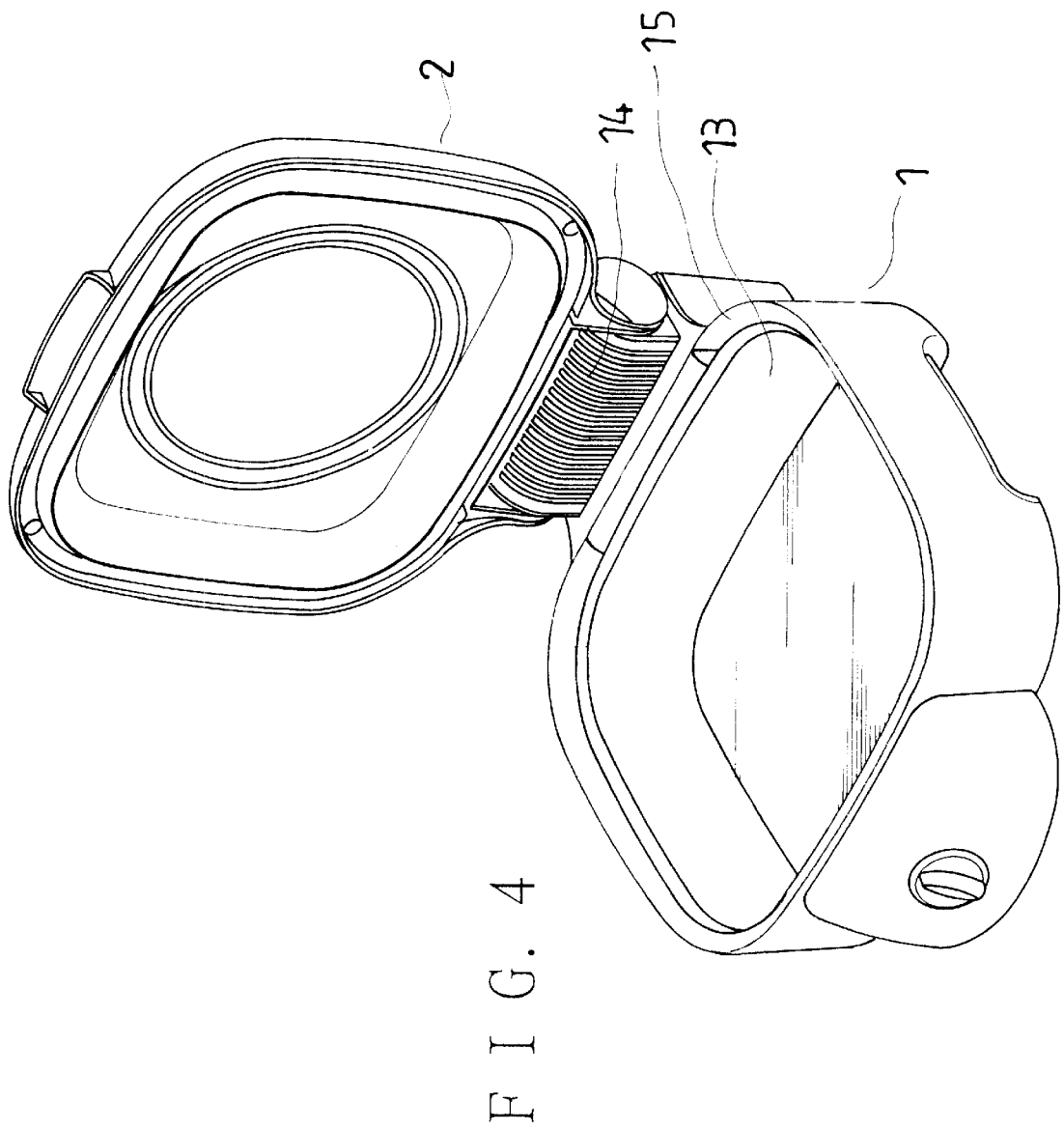
FIG. 4 is a perspective view of the cooker with the smoke filtering device according to the present invention.

Referring to FIGS. 1 and 3, a cooker equipped with a smoke filtering device of the present invention includes a main body 1, an upper cover 2, a fan 3, a bottom covering part 4 and a rear net 5.

The main body 1 has an adjustment knob 11 on the front side, a heating device 10 on the bottom, and a holding part 12 on the rear side; the holding part 12 has a receiving room therein, a curved net 14 is fixed to the top of the holding part 12 with a support member (not numbered), which has connecting holes 19 at two ends. An inner pot 13 is removably received in the main body 1 to come into contact with the heating device 10; the inner pot 13 has an upper edge 15 folded outwardly. The outwardly folded edge 15 forms airtight connection with the main body 1 except the rear portion; a vent aperture 101 is formed between the rear portion of the folded edge 15 and the main body 1 such that smoke produced by the heating device 10 can travel therethrough into the holding part 12.

The holding part 12 has an opening at the rear portion, and a connecting trench 18 at the upper portion of the edge defining the opening. The holding part 12 further has connecting poles 16 sticking down therein, which each has a screw hole.

The upper cover 2 has a connecting protrusion 21 at the rear end that has two parallel connecting extension portions 22 at two ends. The upper cover 2 is pivoted to the connecting hole 19 from the extension portion 22 such that the connecting protrusion 21 can cover the curved net 14 when the upper cover 2 is pivoted down to cover the main body 1. In addition, an inner covering part 23 is secured to the lower side of the upper cover 2; the inner cover part 23 has an annular protrusion 24 that will abut the inner side of the upper folded edge 15 of the inner pot 13 to form a close connection with the folded edge 15.

The fan 3 is fitted to the motor 31. The bottom covering part 4 has a holding part having a holding room 41, and hollow connecting poles 42, which each has a through hole 43 on the top. The motor 31 is secured to the holding room 41. And, the bottom covering part 4 is fixedly connected to the holding part 12 of the main body 1 by means of screws 44 that are passed through the through holes 43 of the hollow poles 42 and screwed into the screw holes of the connecting poles 16 in the holding part 12. Thus, the fan 3 faces the opening of the holding party 12, and both the bottom covering part 4 and the lower portion of the holding part 12 form airtight connection. In addition, the bottom covering part 14 has connecting trenches 45 on the rear edge. The rear net 5 is fixedly disposed in the rear opening of the holding part 12; the rear net 5 has an upper insertion portion 51, and lower insertion portions 52 inserted into the connecting trench 18 of the holding part 12, and the connecting trenches 45 of the lower covering part 4 respectively. Furthermore, a filter cotton 53 is disposed on the inner side of the rear net 5.

Figure 5:
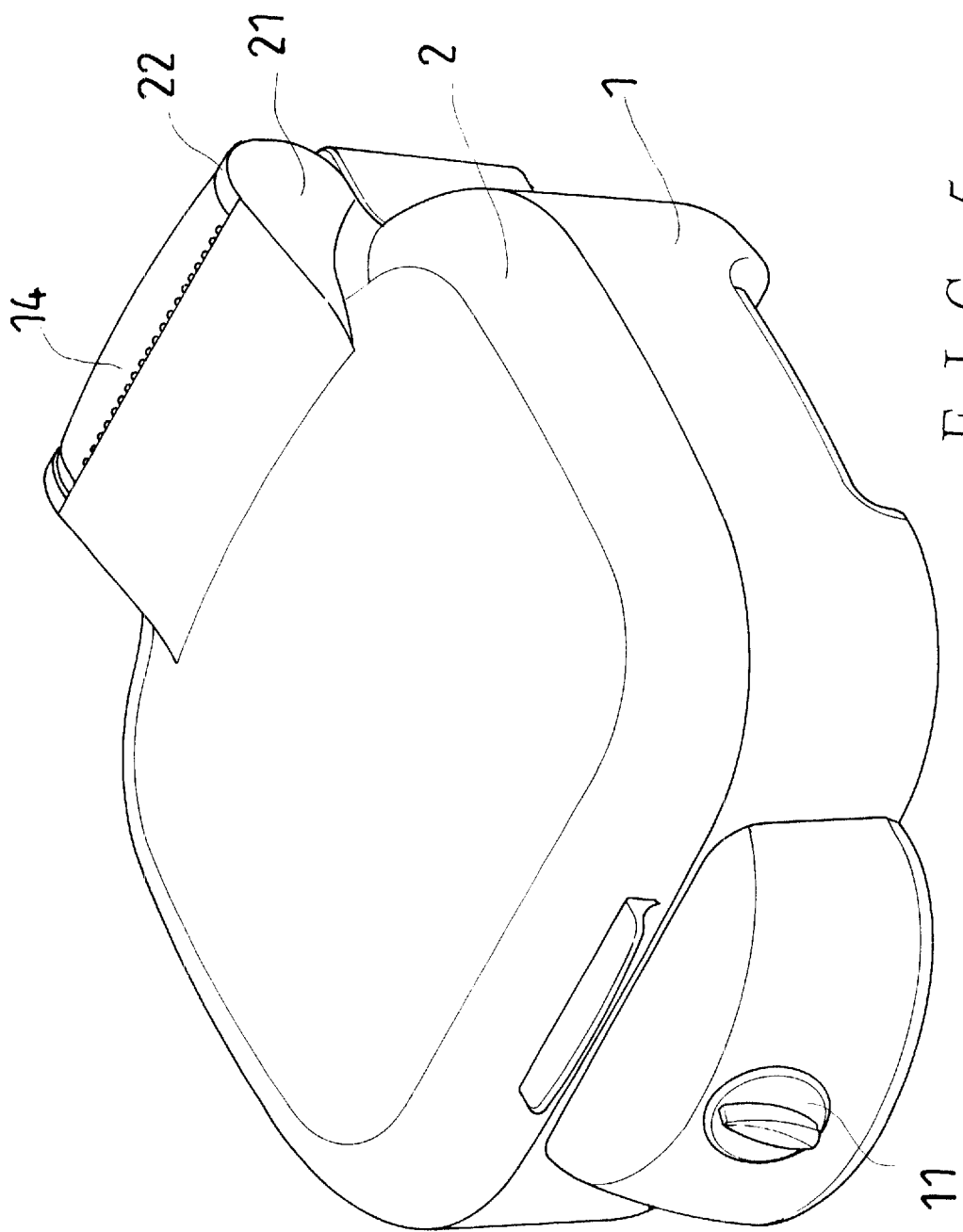
FIG. 5 is a another perspective view of the cooker with the smoke filtering device according to the present invention.

Referring to FIGS. 3 and 5, when the cooker is used to cook foods with the main body 1 being covered by the upper cover 2, the user can turn on the fan 3 with the adjustment knob 11 such that smoke produced by the heating device 10 can be emitted to the atmosphere through the vent aperture 101, the curved net 14, the filter cotton 53, and the rear net 5; the soot in the smoke is absorbed by the filter cotton 53 so as not to be emitted. In addition, when the upper cover 2 is opened, the fan 3 will also cause the gas in the inner pot 13 to travel through the curved net 14, the filter cotton 53, and the rear net 5, thus reducing the amount of soot that would exit to harm the health of the nearby people.

From the above description, it can be easily understood that the cooker with the smoke filtering device of the present invention has the following desirable features:

1. The soot of the smoke produced when the cooker is used can be substantially completely absorbed by the curved net, the filter cotton as well as the rear net, therefore the smoke can't harm the health of the user or the nearby people when it is emitted.
2. The adjustment knob on the main body of the cooker allows the user to turn on the fan at any suitable time for the same to make the smoke pass through the filter cotton to be cleaned thereby.

What is claimed is:

1. A filtering device for smoke produced by a cooker;

said cooker including a main body having an upper cover; said main body receiving an inner pot therein;

said main body having a rear holding part having a receiving room;

said inner pot and said main body forming a vent aperture therebetween communicating with said receiving room of said holding part; said upper cover being pivoted to a support member formed on top of said holding part; said holding part having a rear opening;

said filtering device comprising a curved net fitted to said support member for allowing smoke produced by said cooker to travel from said vent aperture into said receiving room therethrough;

a fan disposed in said receiving room of said holding part;

a rear net fixedly disposed in said rear opening of said holding part;

said rear net being faced with said fan;

a filter cotton disposed on an inner side of said rear net; whereby smoke produced by said cooker is made to travel through said curved net, said filter cotton as well as said rear net from said vent aperture, thus allowing soot of said smoke to be absorbed by the same.

2. The filtering device for smoke produced by a cooker as claimed in claim 1, wherein said fan is fitted to a bottom covering part having a plurality of hollow connecting poles each having a top through hole; said holding part of said main body has downwards sticking connecting poles corresponding to said hollow connecting poles of said bottom covering part; said downwards sticking poles each having a screw hole; said bottom covering part being secured to said holding part by means of screws passing through said through hole thereof and screwed into said downwards sticking poles of said holding part.

3. The filtering device for smoke produced by a cooker as claimed in claim 1, wherein said fan is fitted to a bottom covering part having a plurality of connecting trenches on a rear edge; and said holding part has a connecting trench at an upper portion of an edge of said rear opening thereof, said rear net being fixedly disposed in said rear opening with an upper insertion portion being inserted into said connecting trench of said holding part; said bottom covering part being fixedly disposed at a bottom of said holding part with said connecting trenches thereof being mounted onto lower insertion portions of said rear net.

4. The filtering device for smoke produced by a cooker as claimed in claim 1, wherein said holding part has a bottom covering part secured to a lower portion thereof, and said fan is fitted to a holding room of said bottom covering part at a motor thereof.

* * * * *